US008510795B1

(12) United States Patent
Gargi

(10) Patent No.: US 8,510,795 B1
(45) Date of Patent: Aug. 13, 2013

(54) VIDEO-BASED CAPTCHA

(75) Inventor: Ullas Gargi, San Jose, CA (US)

(73) Assignee: Google Inc., Mountain View, CA (US)

( * ) Notice: Subject to any disclaimer, the term of this patent is extended or adjusted under 35 U.S.C. 154(b) by 858 days.

(21) Appl. No.: 11/849,699

(22) Filed: Sep. 4, 2007

(51) Int. Cl.
G06F 17/30 (2006.01)
G06F 15/16 (2006.01)
G06F 12/00 (2006.01)
H04L 9/32 (2006.01)
G06K 9/36 (2006.01)
G09B 3/00 (2006.01)

(52) U.S. Cl.
USPC ............ 726/2; 726/5; 726/6; 726/7; 726/18; 726/19; 713/176; 713/179; 713/180; 382/276; 434/322

(58) Field of Classification Search
USPC .................... 713/176, 179, 180; 382/276
See application file for complete search history.

(56) References Cited

U.S. PATENT DOCUMENTS

| | | | | |
|---|---|---|---|---|
| 6,863,606 B1 * | 3/2005 | Berg et al. | ............... | 463/16 |
| 7,613,691 B2 * | 11/2009 | Finch | ............... | 707/3 |
| 2002/0172394 A1 * | 11/2002 | Venkatesan et al. | ........ | 382/100 |
| 2004/0025025 A1 * | 2/2004 | Venkatesan et al. | ........ | 713/176 |
| 2005/0039057 A1 * | 2/2005 | Bagga et al. | ................ | 713/202 |
| 2005/0097312 A1 * | 5/2005 | Mihcak et al. | ............... | 713/150 |
| 2006/0026628 A1 * | 2/2006 | Wan et al. | ................ | 725/32 |
| 2007/0026372 A1 * | 2/2007 | Huelsbergen | ............... | 434/322 |
| 2007/0100851 A1 * | 5/2007 | Golovchinsky et al. | ...... | 707/100 |
| 2007/0234423 A1 * | 10/2007 | Goodman et al. | ............. | 726/21 |
| 2008/0072293 A1 * | 3/2008 | D'Urso | ............... | 726/4 |
| 2008/0127302 A1 * | 5/2008 | Qvarfordt et al. | ............... | 726/2 |

OTHER PUBLICATIONS

Chew, M. et al., "Image Recognition CAPTCHAs," In Proceedings of the 7th International Information Security Conference (ISC 2004), Sep. 2004, Springer, pp. 268-279.

* cited by examiner

Primary Examiner — Nasser Goodarzi
Assistant Examiner — Kyu Chae
(74) Attorney, Agent, or Firm — Fenwick & West LLP

(57) ABSTRACT

A system and a method automatically generate video-based tests to distinguish human users from computer software agents. The system comprises a CAPTCHA generation engine, a CAPTCHA serving engine, a video clips database, and a video tests database. The CAPTCHA generation engine selects a video clip from the video clips database, and segments the video clip into multiple video segments. For each video segment, the CAPTCHA generation engine associates a plurality of related queries with the video segment, generates a video test based on the association, and stores in the video tests database. A CAPTCHA serving engine selects a video test for a user, maintaining a user trial counter for each user taking the video test. Based on the user trial counter information and the response to the selected video test, the CAPTCHA serving engine determines whether the user is a human user.

34 Claims, 6 Drawing Sheets

VIDEO-BASED CAPTCHA

BACKGROUND OF THE INVENTION

1. Field of the Invention

The present invention relates generally to methods and systems to serve data over a network, and in particular to automatically generate video-based tests to distinguish human users from computer software agents in a communications network.

2. Background

CAPTCHA stands for "Completely Automated Public Turing Test to Tell Computers and Humans Apart". A CAPTCHA is a test that can be automatically generated, which most human can pass, but that current computer programs cannot pass. CAPTCHAs have been used to prevent automated software ("robots" or bots) from performing actions that are intended specifically for humans, such as account registration, service provisioning, bill payment, and so forth. Excessive use of such services by robots quickly leads to degradation of the quality of service of a given system, as well as problems in fraud and spam. The concept behind CAPTCHAs arises from real world problems faced by many Internet companies. Various online business offer free services, such as email accounts, that have suffered from a specific type of attack: bots can sign up for thousands of email accounts every minute from which the bots could send out junk mails. Similarly, business that sell limited items in high demand, such as online ticket brokers, are subject to attack in which bots are used to purchase large quantities of tickets, for resale at higher prices. CAPTCHAs offer a plausible solution to solve these problems: a human user is required to solve a CAPTCHA test before he/she receives an email account, completes a transaction, and so forth.

Currently there exists a variety of CAPTCHA implementations that provide different types of tasks. Types of tasks include: text recognition, image recognition, and speech recognition. GIMPY and EZ-GIMPY are two of many CAPTCHAs based on the difficulty of reading distorted text. GIMPY works by selecting several words out of a dictionary and rendering a distorted image containing the words. GIMPY then displays the distorted image, and requires the human user to input the words in the image. Given the types of distortions that GIMPY uses, most humans can read the words from the distorted image, but current computer programs cannot. The majority of CAPTCHAs used on the Web today are similar to GIMPY in that they require the user to correctly identify some content in a distorted image.

PIX is an imaged-based CAPTCHA. PIX has a large database of labeled images. All of the pictures stored in the database are pictures of well known objects, such as a horse, a table, a flower, etc, each of which are labeled with the appropriate name of the object. PIX picks an object label at random (e.g., "horse"), finds six images of having that object label from its image database, presents the images to a user. The user must then input a label that correctly matches the known label for the object.

The underlying assumption of these types of CAPTCHAs is that current image recognition algorithms run by computer software agents cannot match human performance in identifying the content of images. But many of the CAPTCHAs in use face challenges due to the increasing sophistication of both image recognition methods. In particular, robots can take advantage of the vast corpus of images available on the Internet to serve as a basis for training image recognition algorithms. Further, because CAPTCHAs are ultimately designed by human programmers, with varying level of skill, robots are able to exploit poorly designed CAPTCHAs. In sum, many existing CAPTCHAs are not well implemented, and as a result are easily broken by robots. CAPTCHA designers typically respond to this threat by making the tests increasingly difficult. The result however is that the CAPTCHA test is too difficult for human users to consistently pass. This results in frustration by human users, and a potential decline in human use of the services being offered.

SUMMARY

To distinguish human users from computer software agents in an online communications environment, embodiments of the invention automatically generate video-tests, provide the video tests to users, analyze user responses to a selected video test, and determine whether the user is a human user.

In one embodiment, a CAPTCHA generation engine is used to create video-tests for subsequent use during CAPTCHA testing. The CAPTCHA generation engine selects a video clip from a video clips database, segments the video clip into multiple video segments, and performs video metadata analysis on each video segment to extract possible video metadata information from the video segment which is often used as cues for identifying activities, human faces, etc. in the video segment. For each video segment, the CAPTCHA generation engine uses a CAPTCHA queries database to associate a plurality of related queries with the video segment being analyzed. More specifically, each video segment along with a multiple number of queries are presented as probes to the users of the CAPTCHA server system. In response to the received answers to the probes from the users, the CAPTCHA generation engine analyzes the users' answers and selects the most relevant responses to the queries to be associated with the video segment being processed. Based on the association, the CAPTCHA generation engine generates a video test and stores in a video test database. Each video test includes a video segment and a plurality of queries associated with the video segment. Each query has a set of correct answers, as determined from the responses gathered from the probes.

A CAPTCHA serving engine selects a video test for a user requesting a particular online application service, monitors the video test by maintaining a user trial counter for each user taking the video test. Based on the user trial counter information and the response to the selected video test, the CAPTCHA serving engine determines whether the user is a human user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
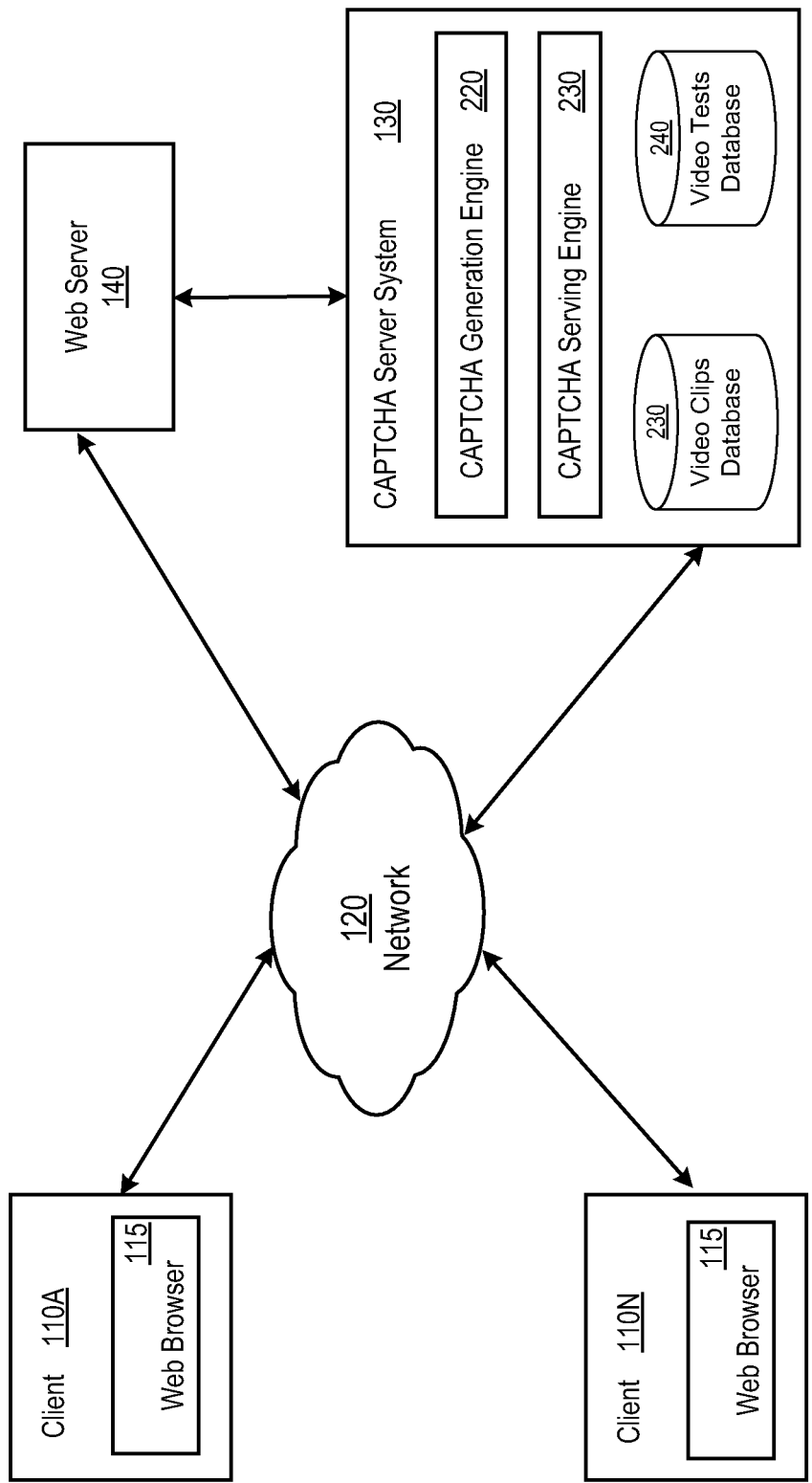
FIG. 1 is a high-level diagram illustrating an environment having a video-based CAPTCHA server system according to one embodiment.

FIG. 1 is a high-level diagram illustrating an environment having a video-based CAPTCHA server system 130 that generates and provides video-based CAPTCHAs to user according to one embodiment. Based on the user's response to a video-based CAPTCHA, the CAPTCHA server system 130 distinguishes a human user from a computer software agent. The environment comprises one or more clients 110 connected to a CAPTCHA server system 130, and a web server 140 via a computer network 120.

A client 110 communicates with the CAPTCHA server system 130 through the computer network 120. The client 110 can be a personal computer (PC) in one embodiment, or a mobile handset or any other electronic computing devices. A user associated with the client 110 may be a human user, or a computer software agent. Only two clients 110 and one CAPTCHA server system 130 are illustrated in FIG. 1 in order to simplify the figure, but in practice there can be thousands or millions of clients 110 using a CAPTCHA server system 130 in some embodiments. Further, other computer servers, such as a web server 140, are communicatively coupled with the CAPTCHA server system 130 via the network 120. The web server 140 serves web pages to the clients 110, and can request a video test from the CAPTCHA server system 130 to be included in such pages. The client 110 executes a web browser 115, either as a standalone application, or with similar functionality embedded in another application.

In general, a client 110 may be any type of suitable processor-based platform that is connected to a network 120 and that interacts with one or more application programs. Client 110 may operate on any operating system capable of supporting a browser or browser-enabled application, such as Microsoft® Windows® or Linux.

The CAPTCHA server system 130 shown comprises a CAPTCHA generation engine 210, a CAPTCHA serving engine 220, a local video clips database 230 and a local video tests database 240. The video clips database 230 and the video tests database 240 may be shared by multiple CAPTCHA server systems 130. The CAPTCHA server system 130 builds the video tests database 240 using the CAPTCHA generation engine 210 with the video clips database 230. The CAPTCHA server system 130 provides the CAPTCHA serving engine 220 as a service to a web server 140 or application server to distinguish a human user from a computer software agent. Generally, a server, depicted as a single computer system, may be implemented as a network of computer processors. Examples of a CAPTCHA server are servers, mainframe computers, networked computers, a processor-based device, and similar types of systems and devices.

In the context of the invention, a video test is a video-based CAPTCHA. Each video test includes a video segment and plurality of queries about the video segment. Each query has a number of correct answers. Compared with the conventional text-based or image-based CAPTCHAS, the video-based CAPTCHAs are relatively easy for a human to correctly answer by recognizing the dominant content, such as activity, object, location, person, or characteristics in a short video clip, but still hard for computer robots to solve consistently because of the many problems inherent in the field of activity recognition in video.

Figure 2:
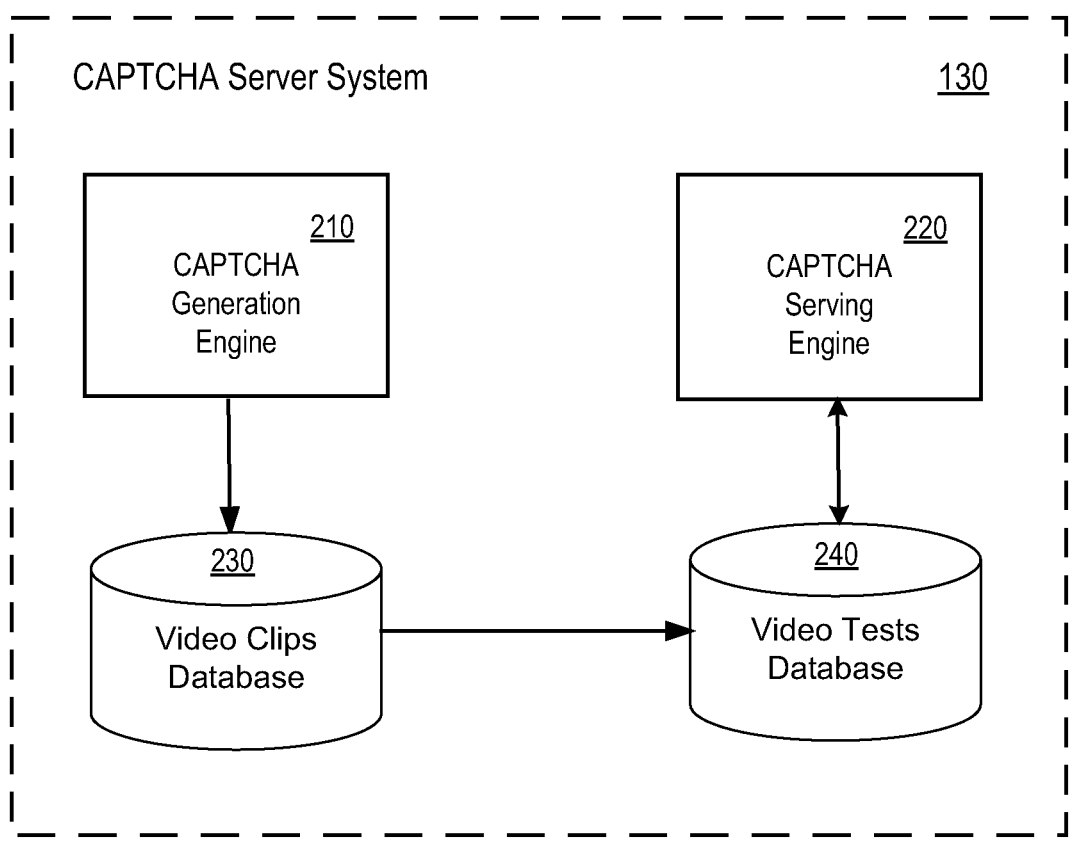
FIG. 2 is a high-level block diagram of a video-based CAPTCHA server system according to one embodiment.

FIG. 2 is a high-level block diagram of a video-based CAPTCHA server system 130 according to one embodiment. The CAPTCHA server system 130 comprises two CAPTCHA processing engines: the CAPTCHA generation engine 210 and the CAPTCHA serving engine 220. In one embodiment, the CAPTCHA server system 130 has two operational phases: a generation phase operated by the CAPTCHA generation engine 210, and a production phase operated by the CAPTCHA serving engine 220. In addition, the CAPTCHA server system 130 includes a video clips database 230 and a video tests database 240. The CAPTCHA generation engine 210 generates video tests using the video clips database 230, and stores the video tests in the video tests database 240. The CAPTCHA serving engine 220 selects a video test from the video tests database 240, analyzes the response to the query associated with the video segment of the selected video test from the user, and determines whether the user is a human user or a computer software agent.

The video clips database 230 collects the video clips from a variety of sources. In one embodiment, the video clips in the video clips database 230 are generated by a web-based video search engine crawling the World Wide Web and collecting the video clips found during such crawls. Video clips may also be obtained from licensed content providers (e.g., stock footage houses), or from video hosting sites that contain user created video content, or from any other sources.

Figure 3:
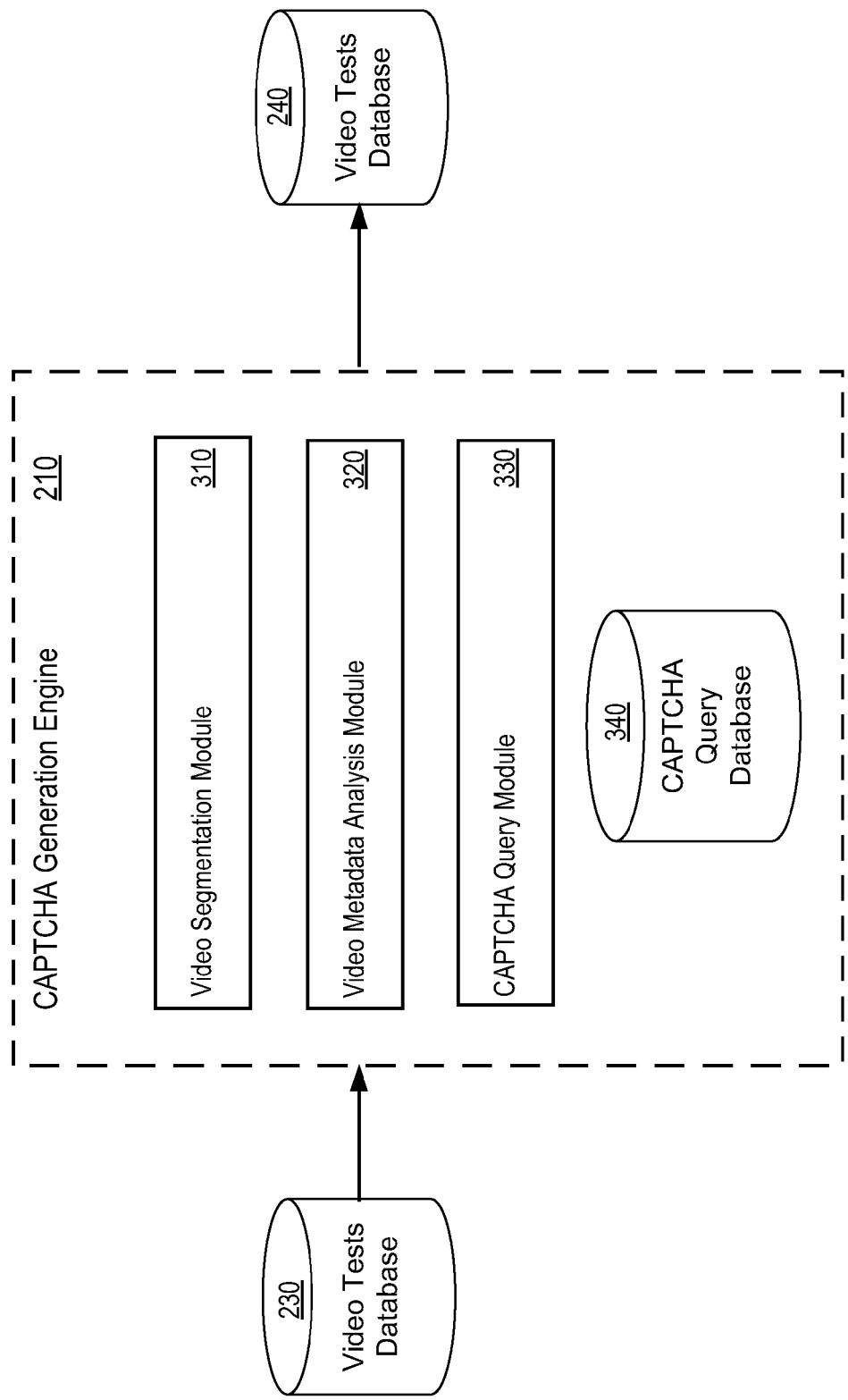
FIG. 3 is a high-level block diagram illustrating modules within a video-based CAPTCHA generation engine according to one embodiment.

FIG. 3 is a high-level block diagram illustrating modules within a video-based CAPTCHA generation engine 210 according to one embodiment. The CAPTCHA generation engine 210 comprises a video segmentation module 310, a video metadata analysis module 320, a CAPTCHA query module 330 and a CAPTCHA queries database 340. The video segmentation module 310 selects a video clip from the video clips database 230 and segments the video clip into multiple video segments. For each video segment of the video clip, the video metadata analysis module 320 extracts the possible video metadata information from the video segment. The CAPTCHA query module 330 uses the CAPTCHA queries database 330 and associates a plurality of queries with the video segment to generate a video test. The CAPTCHA generation engine 210 stores the generated video test into the video tests database 240.

The video segmentation module 310 breaks up a video clip into shorter segments. Each video segment has a subset of video frames of the video clip; a video clip can include either a continuous sequence of frames, a discontinuous sequence or set of frames. Any generic video segmentation algorithms, such as MPEG-7 video segmentation tools, scene change detection algorithms, temporal fixed length algorithms (e.g. 15 seconds per segment), or a combination of such algorithms, may be used as the video segmentation module 310. In one embodiment, the video segments by the video segmentation module 310 are in standard video formats, such as H.264 video formats, 15 frame-per-second (fps) FLASH, and the like.

The purpose of the video metadata analysis module 320 is to extract possible video metadata information from the video segment, which is often used as cues for identifying objects of interest, such as human faces, motion, shapes, etc. in the video segment. In one embodiment, the video metadata comprise textual video metadata, such as annotation, title, publisher, data, content abstraction, and closed-caption data, are often associated with a video segment. The textual video metadata are generally defined by the rich video semantic information contained in a video segment. In another embodiment, video metadata analysis module 320 uses tags that are associated with the video segment as the video metadata since the tags are used to label the video segment. Thus, the CAPTCHA generation engine 210 may use the extracted video metadata information from the video segmentation to efficiently generate video tests. For example, assume that a particular video is a one minute video clip of a dog catching a frisbee at a beach, and that this video includes metadata such as the tags "dog", "Sunset Beach", "Frisbee". Then these tags can be associated with the individual segments of the video clip, and used as possible correct answers to queries for the segments. In another embodiment, a video content analysis may be run on each video segment, such as face detection algorithms, to identify particular semantic features in the video. The video metadata analysis module 320 treats results of the content analysis of the video segment as a source of metadata. The results of the content analysis may suggest what kinds of queries are associated with the video segment. For example, a famous person's face is detected in a video. A query for the video segment may be "what is the name of the person?" The implementation mechanics of video content analysis are known to those of ordinary skill in the relevant art.

For each video segment, the CAPTCHA query module 330 uses a CAPTCHA queries database 340 to associate a plurality of queries with each video segment. In one embodiment, each video segment along with a multiple number of queries is presented as probes to users in an online context, such as when signing onto a service, completing a transaction, registering for an account, and so forth. In another embodiment, the probes are presented to the users of the CAPTCHA server system 130. The probes may also be presented to users of a third-party computer system in any other context, for example in an entertainment environment, such as a video sharing website. In response to the received answers to the probes from the users, the CAPTCHA query module 330 analyzes the users' answers, selects the most relevant queries to be associated with the video segment being processed, and generates the video tests by such association.

The CAPTCHA queries database 340 stores a plurality of CAPTCHA queries and their associated correct answers. Each CAPTCHA query is an answerable question. After the queries are used as probes and answers are collected, there will be some number of correct answers for each video; the correct answers can be determined by analysis of the users' answers to the probes. Queries may be designed about identifying the location of an object, the primary object, the primary activity, etc, in the video segment. The queries are designed to elicit a response that a human can readily answer, but that would be difficult for a software agent to answer. Example queries include:

"What is the name of the person shown in this video?"
"What animal is shown in this video?"
"What is the activity shown in this video?"
"What is the location shown in this video?"
"How many people are shown in this video?"

Preferably, the queries associated with the video segments are "generic" and can be asked of most videos, such as the queries shown above. In one embodiment, the CAPTCHA query module 330 selects queries randomly from the CAPTCHA queries database 340, associates the related queries with each video segment, and generates the video tests by such association. In another embodiment a large set of generic queries can be provided, and then selected from a given video segment based on the information extracted from the metadata, using rules that map particular tags to categories or instances of queries. For example, CAPTCHA generation engine 210 can use the "dog" tag for the above video segment to initially select a set of generic queries of the queries database 340 related to dogs or more generally animals. In other examples, CAPTCHA generation engine 210 may use linguistic analysis of the tags from the metadata to guide the query selection, such as selecting queries based on grammatical type of tags. For example, if the tag is a noun, a set of "what is it" queries may be selected preferably. If the tag is a person name, a set of "who is it" queries may be selected preferably. CAPTCHA generation engine 210 may use semantic analysis of tags from the metadata to guide the query selection, such as selecting queries based on semantics of tags. For example, if the tag refers to a sport, a set of "what is happening" queries may be selected preferably.

In some cases the queries has no "answer" (i.e., there is no animal shown in the video), in which case the provided responses to the probe would be more or less random. This is acceptable, since others of the questions will have meaningful answers, such as a query as to how many people are in the video. In the query generation phase, a given video is used as a probe hundreds, potentially thousands of times, to collect responses from various users. Thus, if there are five queries as above, and a given video is used in 10,000 probes, and each query is presented an equal number of times, then there are 2000 answers for each query. This will be enough answers to each of the five queries so that a distribution of answers can be collected to find the most relevant, e.g., the most frequent, (top 2 or 3) for each query for this video. If a query gets a roughly equal distribution of many different answers, that shows the question is not an appropriate question. Similarly, rules can be used to check that answers are valid; for example if the most popular answer to a question is "none" that would also indicate that the question is inappropriate.

For example, assume that a video segment shows a dog catching a frisbee at a beach, as mentioned above. For this video segment, a query such as "What is the location shown in this video?" the correct answers could be "sea" and "beach". For the query "What animal is shown in the video?" The correct answer is "dog". For another query "What is the activity shown in this video?" the correct answers are "catching the frisbee" and "playing". These correct answers would be determined from analysis of the distribution of all of the answers from the users. The CAPTCHA query module 330 would thus generates a video test that includes the dog-catching-frisbee video segment, the above three queries and their set of correct answers, and stores the video test into the video tests database 240. Other queries, such as what is the name of the person shown in the video would not be valid, again as determined by the number and the distribution of answers.

To generate the video tests as described, the CAPTCHA generation engine 210 is run in generation phase. For example, a given video segment is selected and pairs with a generic query from the CAPTCHA queries database 340; each pairing is used as a probe hundreds, potentially thousands of times, to collect responses from various users. These probes are presented to users in an online context, such as when signing onto a service, completing a transaction, registering for an account, and so forth. The CAPTCHA query module 330 collects all the answers from the users, and determines which queries are valid, and for such query, which answers are correct, for example using the top N answers for each query as the correct answers. In one embodiment, N represents at least minimum 30% votes from all testers. In another embodiment, N represents the most common answers collected from the testers (e.g., N=2 or N=3). In another embodiment, the CAPTCHA query module 330 maintains a running count of the various answers, and can selectively remove one of the queries based on the answers being received. For example, assume a query gets an equal distribution of a large (e.g., 10) number of different answers. This distribution suggests that the query is not appropriate for the video segment being processed. Thus, the CAPTCHA query module 330 marks the query as inappropriate for the video segment being processed, and does not run any further probes on this inappropriate query.

Figure 5:
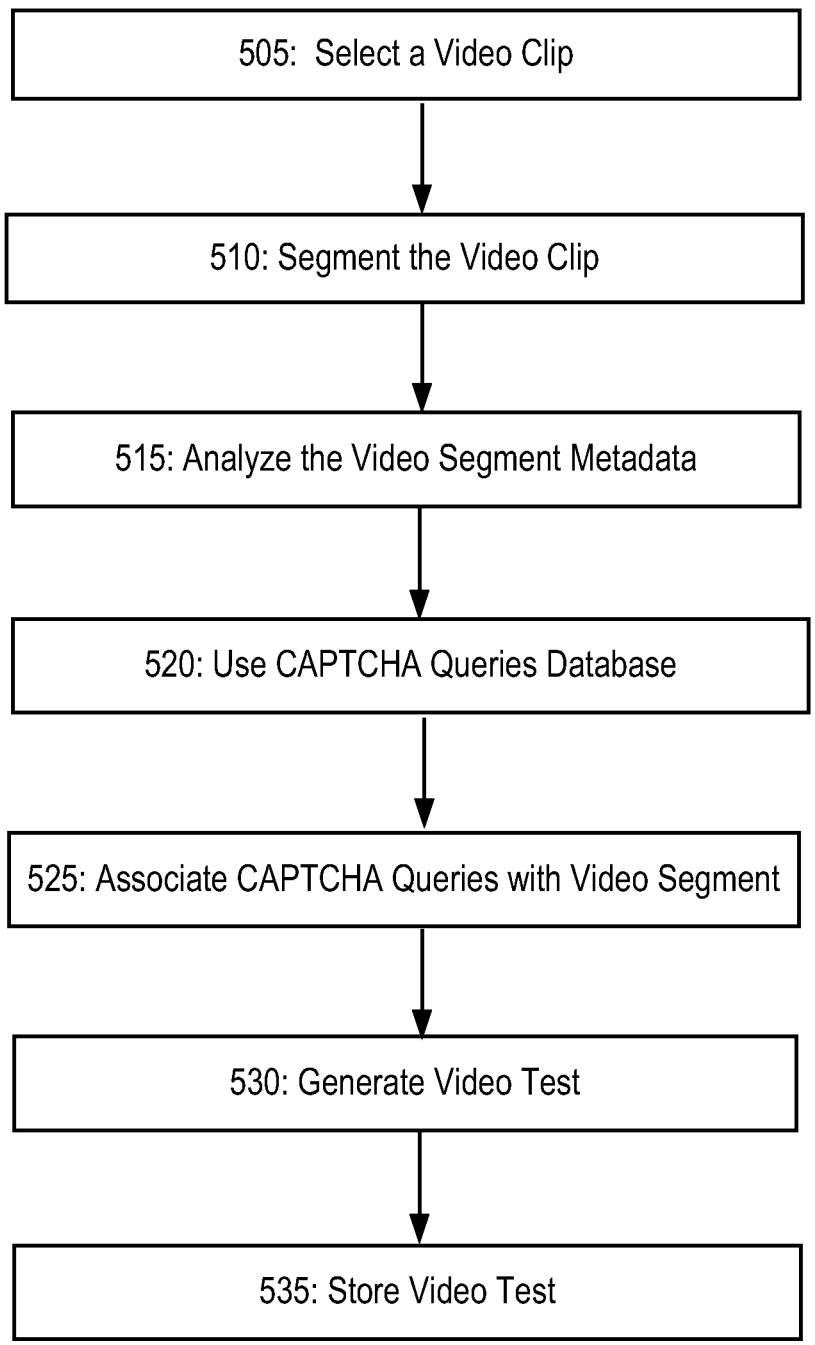
FIG. 5 is a flowchart showing a method of using the CAPTCHA generation engine of the CAPTCHA server system according to one embodiment.

FIG. 5 is a flowchart showing a method of using the CAPTCHA generation engine 210 of the CAPTCHA server system 130 according to one embodiment. A typical embodiment of the CAPTCHA server system 130 processes a large volume of requests concurrently. Thus, the CAPTCHA server system 130 concurrently performs multiple instances of the steps described here, for example, in multiple threads.

Initially, the CAPTCHA generation engine 210 selects 505 a video clip from the video clips database 230, segments 510 the video clip by the video segmentation module 310 into multiple video segments. The CAPTCHA generation engine 210 analyzes 515 each video segment using the video metadata analysis module 320 and extracts video metadata information from the video segment. For each video segment, CAPTCHA generation engine 210 uses 520 the CAPTCHA queries database 340, associates 525 related CAPTCHA queries with the video segment using the CAPTCHA query module 330, and generates 530 the video test via the association. Finally, the CAPTCHA generation engine 210 stores 535 the video test in the video tests database.

Figure 4:
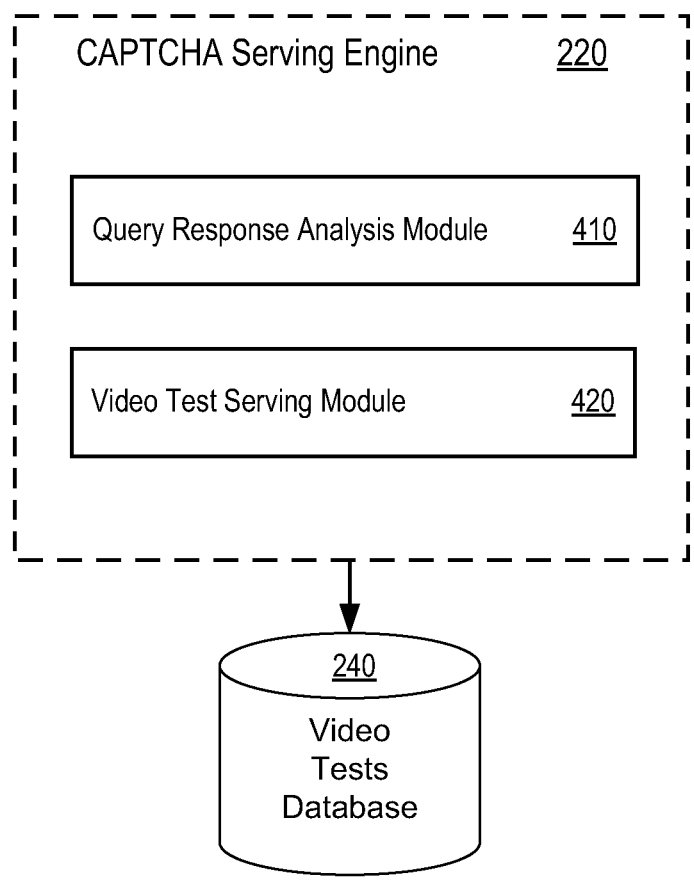
FIG. 4 is a high-level block diagram illustrating modules within a video-based CAPTCHA serving engine according to one embodiment.

FIG. 4 is a high-level block diagram illustrating modules within a video-based CAPTCHA serving engine 220 according to one embodiment. The CAPTCHA serving engine 220 comprises a video test serving module 420 and a query response analysis module 410. The CAPTCHA serving engine 220 exposes an application programming interface by which the web server 140, can request the CAPTCHA serving engine 220 to provide a video test, which is then included in a web page served by the web server 140. In response to a request by the web server 140, the video test serving module 420 selects a video test from the video tests database 240 and provides the video test to web server 120. The web server 120 provides a web page with the video test to the user over the network 120. The user's response is provided to the query analysis module 410. The query response analysis module 410 analyzes the response to the selected query associated with the video test from the user. Based on the analysis result, the query response analysis module 410 determines whether the user is a human user or a computer software agent.

For each user taking the video-based CAPTCHAs, the CAPTCHA serving engine 220 maintains a counter of the number of times the user receiving the test has attempted to provide a correct answer. The initial value of the counter is zero for each user. If the counter exceeds a predetermined threshold value, the CAPTCHA serving engine 220 stops sending more video tests to the user and determines the user is not a human user.

The video test serving module 420 selects a video test from the video tests database 240, and provides the video test to the web server 140. The CAPTCHA serving engine 220 instantiates a counter for the user of this test. In one embodiment, the video test includes a video segment and one of related queries. The web server 140 embeds the video test in a web page and serves the web page to the user. The client 110 associated with the user renders the web page, which includes the video test. In response to the click on the video test by the user, the video test serving module 420 streams the video segment of the video test as an embedded video.

In one embodiment, additional measures are taken to guard against the potential of lookup attacks by bots. In a lookup attack on the CAPTCHA system, a human user would first take a video test and provide a correct answer; at the same time, a bot would create a hash of the video, and store this in the attacker's website. Eventually the attacker would compile a large collection of the hashes. The bots would then attack the CAPTCHA site, so that when a video test is presented, the bot would generate a hash of the video and use that hash to lookup a matching hash stored in the attacker's site. If a match is found, then the bot would obtain the correct answer to the video test, and thereby defeat the CAPTCHA system. To prevent this type of attack, one countermeasure is to insert one or more external frames into a video test at runtime. For example, in an embodiment, the CAPTCHA serving engine 220 selects one or more video frames from a video frames storage repository, for example, the video clips database 230, as the external frame(s), and insert the external frame(s) into the video segment, prior to it being served to the client 110. The external frame(s) are to be inserted into the beginning, or the middle or the end of the video segment. The addition of a single frame (as well as multiple frames) will result in a completely different hash value for the video segment, and thereby prevent a bot from identifying the video as one for which it has a stored answer.

In another embodiment, the video CAPTCHA serving engine 220 randomly selects one or more video frames from a video frames storage repository, and reencodes the video segment with the selected external frame(s) inserted into the segment. The video CAPTCHA serving engine 220 presents the reencoded video segment along with the selected query as a video test to a user. The selected external frame(s) may include a subset of selected frames of another video segment of the video test, or a plurality of synthetically (i.e. computer) generated images, or a plurality of video frames from a video clip stored in the video clips database 230.

During or after the video test, the user may submit a response to the included query. The CAPTCHA serving engine 220 increments the counter for the user taking the test, and checks whether the counter has exceeded a predetermined threshold value. In one embodiment, the predetermined threshold value for the counter is four, thereby allowing three attempted answers. In other embodiments, the predetermined threshold value for the counter is another reasonably small integer number. If the counter exceeds the predetermined threshold value, user is deemed to be a software agent. In this case, the CAPTCHA serving engine 220 stops sending more video tests to the user.

If the counter does not exceed the predetermined threshold value, the CAPTCHA serving engine 220 forwards the response to the query response analysis engine 410. The query response analysis module 410 analyzes the response to the selected query from the user.

In one embodiment, the query response analysis module 410 compares the response to the selected query from the user with the set of correct answers associated with the query. The query response analysis module 410 determines the user as a human user if the response to the selected query from the user matches one of the correct answers of the selected query. Otherwise, the query response analysis module 410 notifies the CAPTCHA serving engine 220 that a new video test needs to be sent to the user for another trial.

Figure 6:
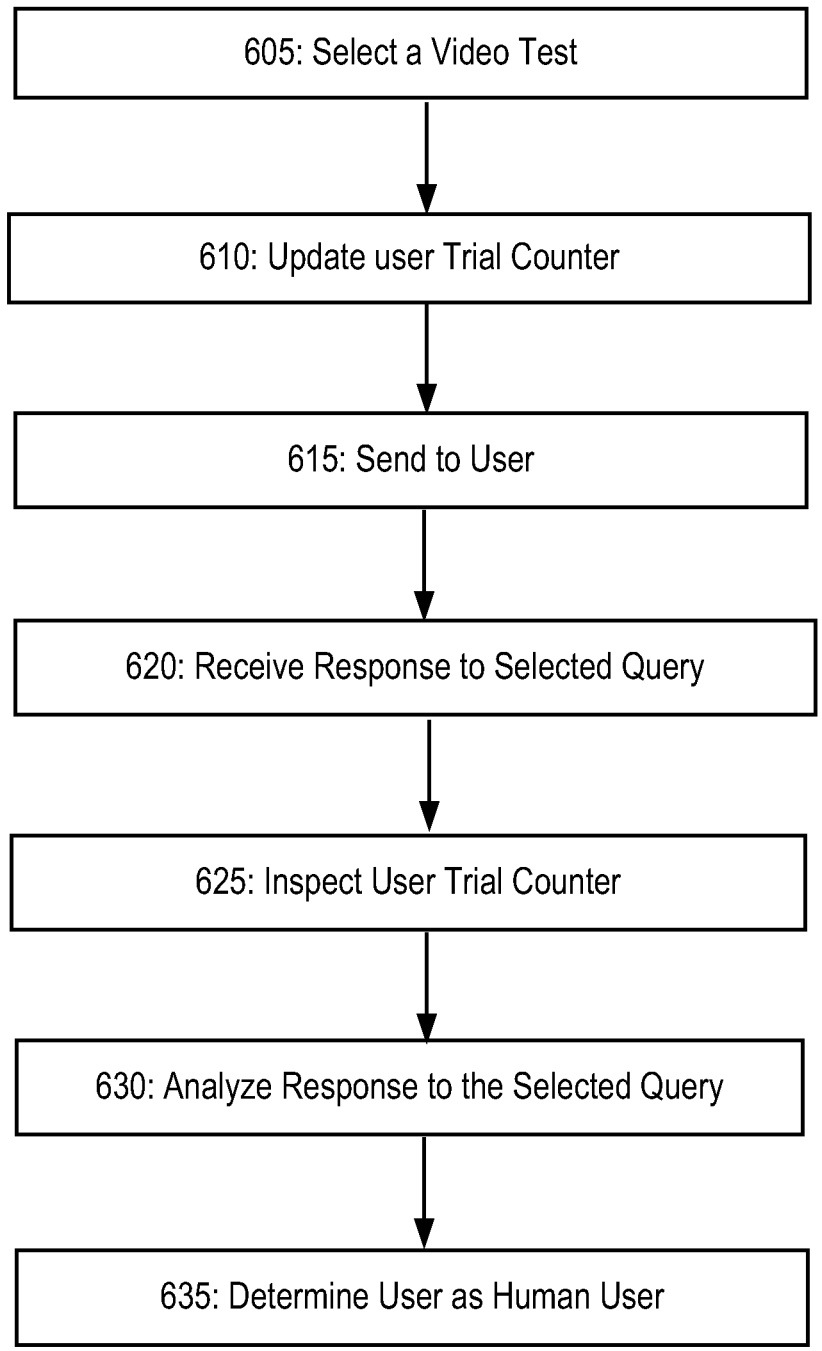
FIG. 6 is a flowchart showing a method of using the CAPTCHA serving engine of the CAPTCHA server system according to one embodiment.

FIG. 6 is a flowchart showing a method of using the CAPTCHA serving engine 220 of the CAPTCHA server system 130 according to one embodiment. A typical embodiment of the CAPTCHA server system 130 processes a large volume of requests concurrently. Thus, the CAPTCHA server system 130 simultaneously performs multiple instances of the steps described here.

Upon receiving a request for video test from the web server 140, the CAPTCHA serving engine 220 selects 605 a video test from the video tests database 240, instantiates 610 an user trial counter and sends 615 the video test to the user via the web server. The CAPTCHA serving engine 220 receives 620 a response to the selected query associated with the video test, inspects 625 the user trial counter to see if the user trial counter has exceeded the predetermined threshold value. If not, the CAPTCHA serving engine 220 analyze 630 the response to the selected query to find any match between the response to the selected query to any of the correct answers associated with the selected query. If such a match is found, the CAPTCHA serving engine 220 determines 635 the user a human user.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer implemented method for generating video tests for distinguishing a human user from a computer software agent in an online application, the method comprising:
 selecting a video clip from a video clips database, each video clip having a plurality of video frames;
 segmenting the video clip into a plurality of video segments, each video segment having a subset of video frames;
 selecting one of the video segments;
 associating the selected video segment with a plurality of queries, each query associated with at least one correct answer to the query, wherein associating a query with at least one correct answer to the query comprises:
  presenting the video segment and a query as a probe to a plurality of users;

collecting answers to the query from the plurality of users; and determining from the collected answers at least one correct answer to the query;

modifying the selected video segment such that the modified video segment is visually similar to the unmodified video segment and a hash value of the modified video segment is different from the hash value of the unmodified video segment to prevent identifying the selected video clip based on the hash value of the unmodified video segment, wherein modifying the selected video segment comprises:

selecting one or more video frames from a video of the video clips database; and re-encoding the selected video segment with the selected video frames;

associating the modified video segment with a plurality of queries and correct answers associated with the queries; and storing the modified video segment and the plurality of queries in a video tests database.

2. The method of claim 1, wherein associating a video segment with a plurality of queries comprises generating at least one query from video metadata information associated with the video segment.

3. The method of claim 1, further comprising:

retrieving a plurality of video clips from a video hosting website in response to a keyword search query including at least one keyword, wherein the selected video clip is included in the plurality of video clips; and wherein associating a video segment with a plurality of queries comprises associating the video segment with the at least keyword of the keyword search query.

4. The method of claim 1, wherein associating the video segment with a plurality of queries further comprises associating the video segment with a query from a set of generic queries, where the generic queries are directed to identifying a dominant content of the video.

5. The method of claim 4, wherein the queries directed to identifying a dominant content of the video comprise queries to an activity in the video, to an object in the video, to a location in the video, and to people in the video.

6. The method of claim 1, wherein determining the at least one correct answer to the query comprises determining the at least one correct answer based on a distribution of answers.

7. The method of claim 1, further comprising eliminating the queries that are not valid based on the collected answers.

8. The method of claim 1, wherein storing a video segment and the plurality of queries in a video tests database comprises storing a subset of frames of the video segment and the plurality of queries in the video tests database.

9. A computer implemented method for distinguishing a human user from a computer software agent in an online application, the method comprising:

selecting a video test from a video tests database, wherein the video test includes a video segment and one of a plurality of queries associated with the video segment, each query having a set of correct answers, and wherein the video test is generated based on the association of the video segment, the plurality of queries and the set of correct answers;

modifying the video segment of the video test such that the modified video segment is visually similar to the unmodified video segment and a hash value generated from the modified video segment is different from the hash value generated from the unmodified video segment to prevent identifying the selected video clip based on the hash value of the unmodified video segment, wherein modifying the video segment comprises:

selecting one or more video frames from a video of the video clips database; and re-encoding the selected video segment with the selected video frames;

displaying the modified video test;

receiving a response to the displayed query from the user; and responsive to the received response matching one of the correct answers, determining the user to be human user.

10. The method of claim 9, wherein selecting a video test from a video tests database comprises displaying a subset of selected frames of the video segment of the video test.

11. The method of claim 9, wherein selecting a video test from a video tests database further comprises inserting at least one external frame into the video segment of the video test.

12. The method of claim 9, wherein displaying a video test further comprises incrementing a user trial counter for the user.

13. The method of claim 9, determining the user to be human user comprises maintaining the user trial counter for each video test taken by the user.

14. The method of claim 9, determining the user to be human user further comprises analyzing the response to the displayed query from the user responsive to the user trial counter not exceeding a predetermined threshold value.

15. The method of claim 14, wherein analyzing the response to the displayed query from the user comprises comparing the response to the displayed query from the user with the set of correct answers associated with the query.

16. A system for generating video tests for distinguishing a human user from a computer software agent in an online application, the system comprising:

a video test generation engine, configured to:

select a video clip from a video clips database, each video clip having a plurality of video frames;

segment the video clip into a plurality of video segments, each video segment having a subset of video frames, present at least one video segment and a query as a probe to a plurality of users and collect answers to the query from the plurality of users;

determine from the collected answers at least one correct answer to the query;

associate the video segment with the query and the at least one correct answer; and store each video segment, the plurality of queries and associated correct answers in a video tests database, and a video test serving engine coupled to the video test generation engine, configured to:

select a video test from the video tests database, display the selected video test, wherein the video test including a video segment and one of a plurality of queries associated with the video segment;

modify the video segment of the video test such that the modified video segment is visually similar to the unmodified video segment and a hash value generated from the modified video segment is different from the hash value generated from the unmodified video segment to prevent identifying the selected video clip based on the hash value of the unmodified video segment, wherein modifying the video segment comprises:

selecting one or more video frames from a video of the video clips database; and re-encoding the selected video segment with the selected video frames;

display the modified video test;
receive a response to the displayed query from the user; and
determine the user to be human user responsive to the received response matching one of the correct answers.

17. The system of claim 16, wherein the video test generation engine further comprises:
a video metadata analysis module for extracting video metadata information from the video segment by analyzing the video segment.

18. The system of claim 16, wherein the video test generation engine further comprises:
a video test query module for selecting a query and a set of correct answers associated with the query from a queries database.

19. The system of claim 18, wherein the video test query module is configured to select a query from a set of generic queries, where the generic queries include queries directed to an activity, to objects, to a location, and to people in a video.

20. The system of claim 18, wherein the video test query module is configured to determine the correct answers to the query comprises by identifying the correct answers based on the distribution of answers.

21. The system of claim 18, wherein the video test query module is configured to collect answers to the query by filtering out the queries that are not valid based on the collected answers.

22. The system of claim 16, wherein the video test generation engine is further configured to store a subset of frames of the video segment and the plurality of queries in the video tests database.

23. The system of claim 16, wherein the video test serving engine further comprises:
a query response analysis module for determining the user to be human user.

24. The system of claim 16, further comprise a video test serving module configured to display a subset of selected frames of the video segment of the video test.

25. The system of claim 24, wherein the video test serving module is further configured to insert at least one external frame into the video segment of the video test.

26. The system of claim 24, wherein the video test serving module is further configured to increment a user trial counter for the user.

27. The system of claim 24, wherein the video test serving module is further configured to maintain the user trial counter for each video test taken by the user.

28. The system of claim 24, wherein the query response analysis module is configured to analyze the response to the displayed query from the user responsive to the user trial counter not exceeding a predetermined threshold value.

29. The system of claim 28, wherein the query response analysis module is further configured to analyze the response to the displayed query from the user by comparing the response to the displayed query from the user with the set of correct answers associated with the query.

30. A non-transitory computer readable storage medium structured to store instructions, the instructions when executed by a processor cause the processor to:
select a video clip from a video clips database, each video clip having a plurality of video frames;
segment the video clip into a plurality of video segments, each video segment having a subset of video frames;
for each video segment, associate the video segment with a plurality of queries, each query having a set of correct answers and each query associated with at least one correct answer to the query, wherein associating a query with at least one correct answer to the query comprises:
presenting the video segment and a query as a probe to a plurality of users;
collecting answers to the query from the plurality of users; and
determining from the collected answers at least one correct answer to the query;
store each video segment, the plurality of queries and associated correct answers in a video tests database;
modify the video segment of a video test such that the modified video segment is visually similar to the unmodified video segment and a hash value generated from the modified video segment is different from the hash value generate from the unmodified video segment to prevent identifying the selected video clip based on the hash value of the unmodified video segment, wherein modifying the video segment comprises:
selecting one or more video frames from a video of the video clips database; and
re-encoding the selected video segment with the selected video frames;
display a video test, wherein the video test including a modified video segment and one of a plurality of queries associated with the video segment, each query having a set of correct answers;
receive a response to the displayed query from the user; and
responsive to the received response matching one of the correct answers, determine the user to be human user.

31. The method of claim 1, wherein modifying the selected video segment such that the modified video segment is visually similar to the unmodified video segment comprises:
selecting one or more video frames from a video of the video clips database; and
inserting the selected video frames to the selected video segment.

32. The method of claim 9, wherein modifying the selected video segment such that the modified video segment is visually similar to the unmodified video segment comprises:
selecting one or more video frames from a video of the video clips database; and
inserting the selected video frames to the selected video segment.

33. The system of claim 16, wherein the video test serving engine is further configured to:
select one or more video frames from a video of the video clips database; and
insert the selected video frames to the selected video segment.

34. The computer readable storage medium of claim 30, wherein modifying the selected video segment such that the modified video segment is visually similar to the unmodified video segment comprises:
selecting one or more video frames from a video of the video clips database; and
inserting the selected video frames to the selected video segment.

* * * * *